United States Patent [19]

Nagata

[11] Patent Number: 4,520,971
[45] Date of Patent: Jun. 4, 1985

[54] FISHING REEL
[75] Inventor: Hiromitsu Nagata, Tokyo, Japan
[73] Assignee: Daiwa Seiko Inc., Tokyo, Japan
[21] Appl. No.: 383,231
[22] Filed: May 28, 1982
[30] Foreign Application Priority Data Jul. 3, 1981 [JP] Japan ................................. 56-99241
Nov. 27, 1981 [JP] Japan ......................... 56-190214[U]

[51] Int. Cl.³ .............................................. A01K 89/02
[52] U.S. Cl. ................................ 242/220; 242/84.53;
242/99; 192/18 R
[58] Field of Search ............................... 242/211–221,
242/84.53, 99; 192/12 R, 18 R, 19; 254/347,
366

[56] References Cited
U.S. PATENT DOCUMENTS

683,940 10/1901 Howe ............................... 242/84.53
2,237,991 4/1941 Howe ............................ 242/84.5 R
2,536,583 1/1951 Tank .................................... 242/211
3,268,182 8/1966 Clark ............................... 242/84.53

Primary Examiner—Billy S. Taylor
Attorney, Agent, or Firm—Browdy and Neimark

[57] ABSTRACT

A double bearing type fishing reel which is provided with a reel mounting leg at an upper portion of a reel body, which reel mounting leg has a fishing rod mounting member and an operating lever pivotably connected to its base portion in such a manner that an operating portion of the lever is positioned under a front portion of the fishing rod mounting member, which operating lever is adapted to be drawn upward by the forefinger of the hand gripping the fishing rod mounting member and fishing rod. This reel permits the clutch operation and spool braking operation to be carried out quickly and easily, controlling the spool braking force to an arbitrary level, and reliably preventing backlash of the fishing line.

2 Claims, 11 Drawing Figures

FISHING REEL

BACKGROUND OF THE INVENTION

1. Field of the Invention

This invention relates to an improvement in a double bearing type fishing reel.

2. Description of the Prior Art

A double bearing type reel, which permits paying out and rewinding the fishing line in a direction at right angles to a spool shaft, has the following advantages over a spinning reel or a closed-face reel, in which the fishing line is payed out and rewound parallel to the spool shaft. When a double bearing type reel is used, the fishing line is not twisted. Moreover, this type of reel allows the fishing hook to be cast to a distant place, and has a high fishing line rewinding power.

However, since this double bearing type reel is fixed to an upper portion of a fishing rod or its casting handle to be put to practical use, the center of gravity of the fishing rod becomes higher than its axis. If a large double bearing type reel is used, the fishing rod becomes unstable in the lateral direction, so that the reel cannot be operated stably.

In order to cast a fishing hook to a distant or desired place using this type of reel, it is necessary to remove a hand from the handle, operate a lever in a clutch mechanism by the same hand to put the spool in a free-rotating state, cast the fishing line, and thereafter press a fishing line winding surface of the spool with the thumb of the hand gripping the fishing rod, to prevent backlash of the fishing line. It requires a great deal of skill to carry out this clutch operation and thumbing operation quickly and smoothly. Therefore, it is very difficult for beginners to handle this type of reel.

SUMMARY OF THE INVENTION

A first object of the present invention is to provide a double bearing type fishing reel which is free from the above-mentioned drawbacks encountered in a conventional double bearing type reel, and which permits the clutch operation and a spool braking operation to be carried out simultaneously with only the hand gripping the fishing rod to pay out the fishing line, whereby the fishing operation can be conducted easily without any skill even by a beginner.

A second object of the present invention is to provide a double bearing type reel which is provided with a reel mounting leg at an upper portion of the reel body, which reel mounting leg has a fishing rod mounting member and an operating lever pivotally connected to a base portion of the reel mounting leg in such a manner that an operating portion of the lever is positioned under a front portion of the fishing rod mounting member, which operating lever is adapted to be drawn upward by the forefinger of the hand gripping the fishing rod mounting member and fishing rod, whereby the clutch operation and spool braking operation can be carried out smoothly, quickly and easily, and which allows the spool braking force to be controlled from low to high levels freely, unlike the conventional reel of this kind which often causes the fingers to be hurt during the spool braking operation, and thereby reliably preventing backlash of the fishing line.

A third object of the present invention is to provide a double bearing type reel which is adapted to be positioned under a fishing rod, whereby the fishing rod and operating lever can be handled stably.

The above and other objects and advantageous features of the invention will become apparent from the following description of the preferred embodiments taken in conjunction with the accompanying drawings.

DESCRIPTION OF THE PREFERRED EMBODIMENTS

A reel mounting leg 6 having a fishing rod mounting member 5 at its upper end is fixedly joined between upper portions of side plates 3, 4 of the body of a double bearing type reel. A spool shaft 2 with a spool 1 mounted thereon is supported on these side plates 3, 4. An operating lever 9 having an operating portion 7 positioned in the vicinity of the lower front portion of the mounting member 5, and an operating member 8 at the inner end thereof is pivotably supported on a base portion of the reel mounting leg 6 in such a manner that the operating portion 7 is urged by a spring 10 away from the mounting member 5.

A substantially disc shaped pivotable member 12 provided with a bore 11 into which the operating member 8 is fitted, is pivotably connected to the lower surface of the reel mounting leg 6 in such a manner that the pivotable member 12 is extended horizontally. The pivotable member 12 is provided at one side of a circumferential portion thereof with an operating projection 13 extending into the side plate 3 of the reel, and on a lower surface of the other side thereof with a cam surface 14.

A pinion 17, which is meshed with a driving gear 16 mounted on a handle shaft 15 in the side plate 3, is mounted as in a known reel of this kind on the spool shaft 2 in such a manner that the pinion 17 can be engaged with and disengaged from a locking portion of the spool shaft 2 freely in accordance with an operation of a clutch mechanism 18, which has a clutch lever 19 engaged with the operating projection 13 referred to above.

The side plate 4 of the reel is provided therein with a brake receiving member 22 pivotably connected at one end to an inner frame 20 and urged upward by a spring 21 at the other end portion. A brake shaft 24 is provided with a brake roll 23 in such a manner that the brake roll 23 confronts a flange portion of the spool 1, and this brake shaft is pivotably supported on an intermediate portion of the brake receiving member 22 so as to project therefrom. An end portion of the brake shaft 24 is in sliding contact with the cam surface 14. The cam surface 14 and operating projection 13 are formed so they have the following relation: When the pivotable member 12 is turned by the operating member 8 of the operating lever 9, the clutch lever 19 is pressed by the operating projection 13 to be moved pivotally. Consequently, the pinion 17 is disengaged from the locking portion of the spool shaft 2 via the clutch lever 19, and, at the same time, the brake shaft 24 is pressed downward by the cam surface 14 to cause the spool 1 to be braked by the brake roll 23.

Figure 1:
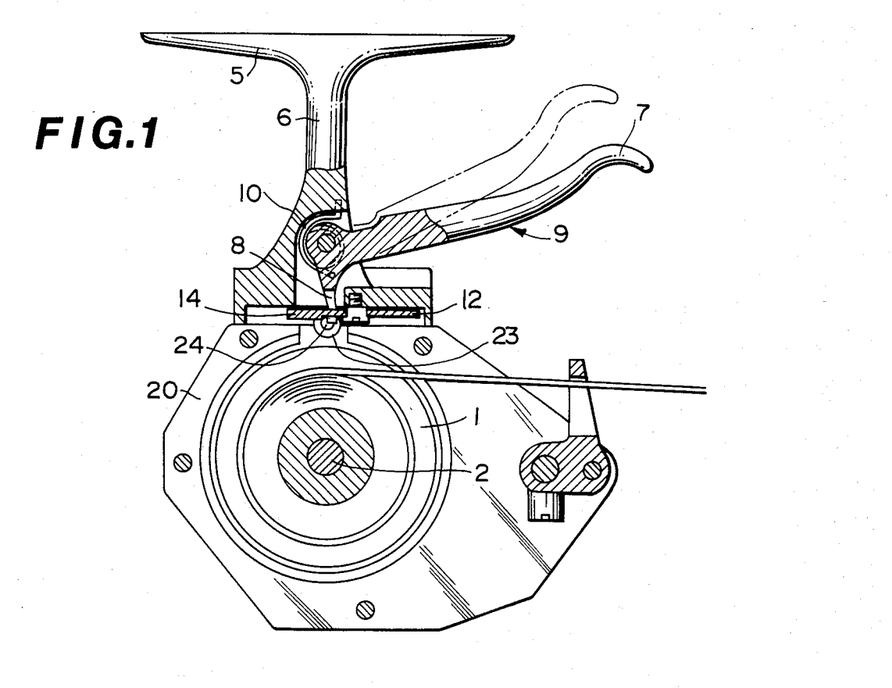
FIG. 1 is a partially cutaway front elevational view in section of the present invention.
Figure 2:
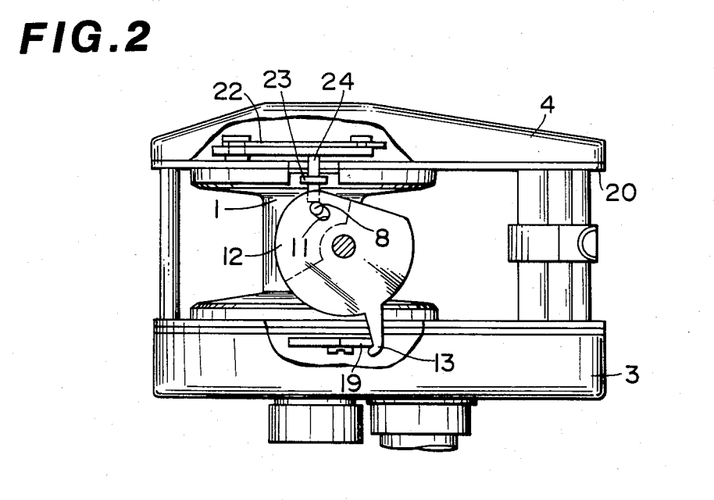
FIG. 2 is a partially cutaway plan view in section of the present invention.
Figure 3:
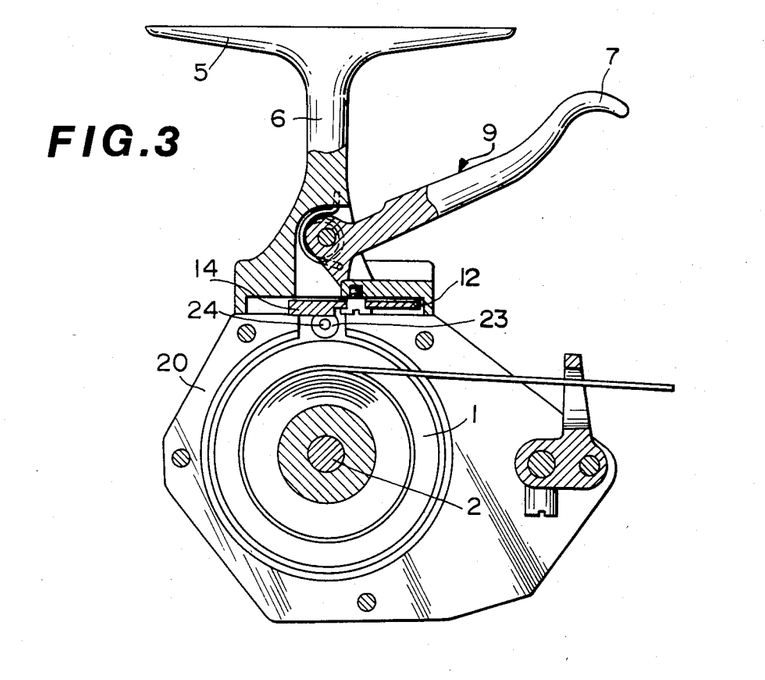
FIG. 3 is a partially cutaway front elevational view in section of the present invention with the operating lever in motion.
Figure 4:
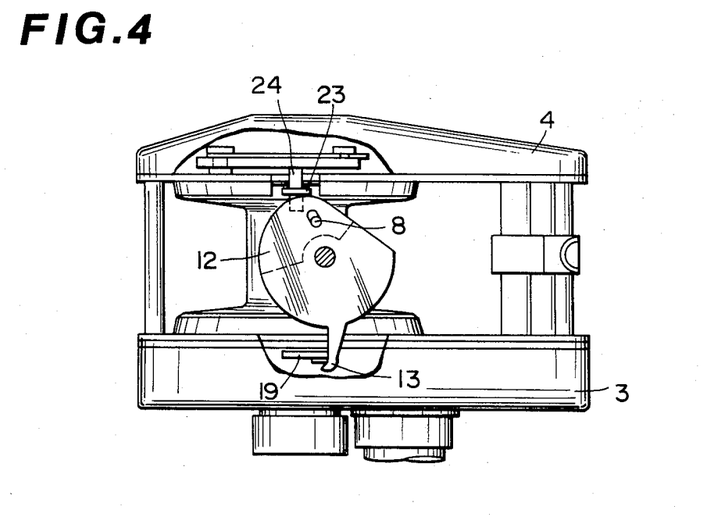
FIG. 4 is a partially cutaway plan view in section of the present invention with the operating lever in motion.
Figure 5:
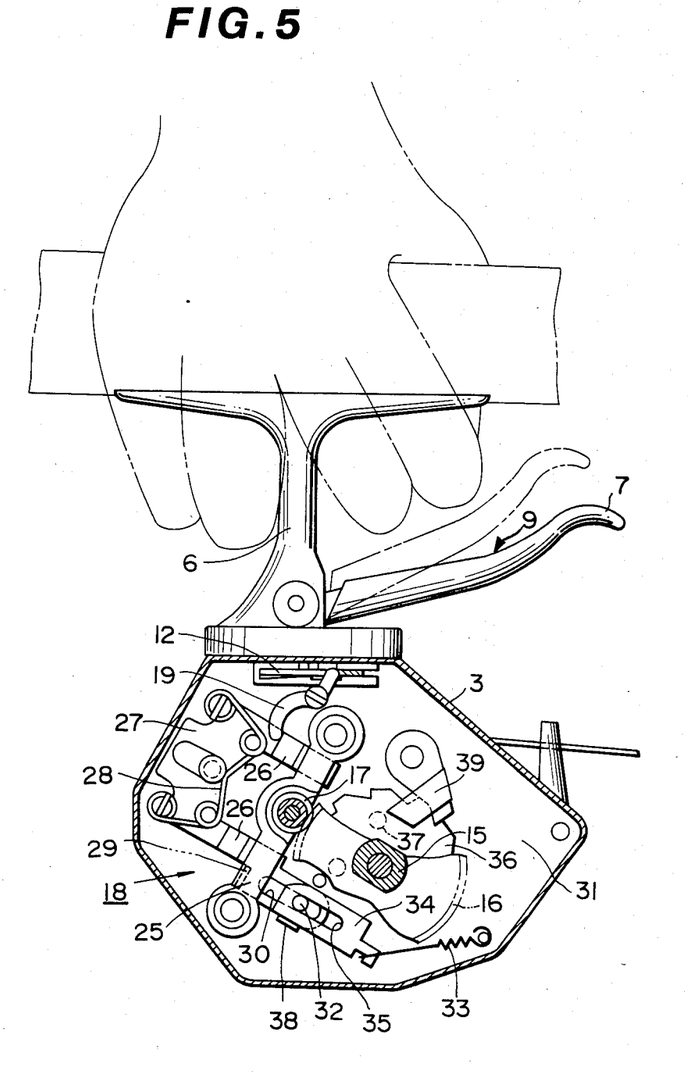
FIG. 5 is a front elevational view of a clutch mechanism in the present invention.
Figure 6:
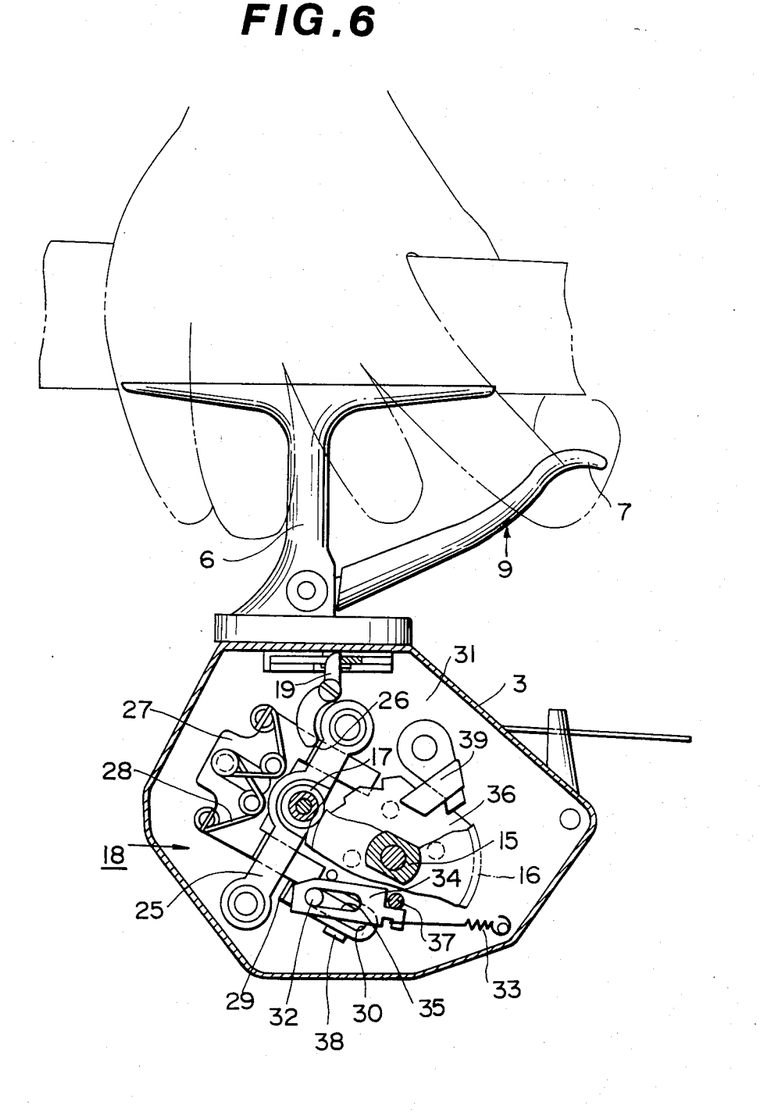
FIG. 6 is a front elevational view of the clutch mechanism in the present invention with the operating lever in motion.
Figure 7:
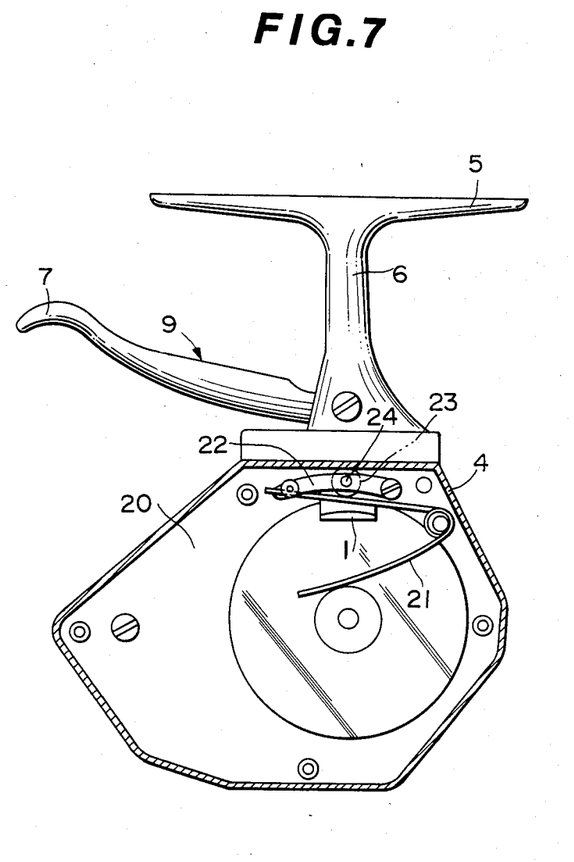
FIG. 7 is a rear view of a spool braking mechanism in the present invention.
Figure 8:
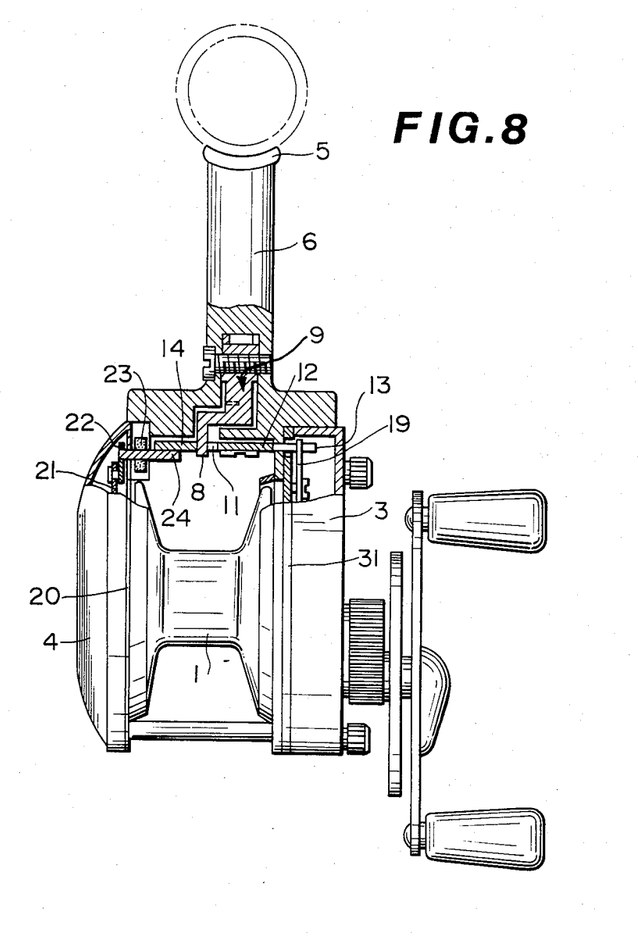
FIG. 8 is a partially cutaway side elevational view in section of the present invention.
Figure 9:
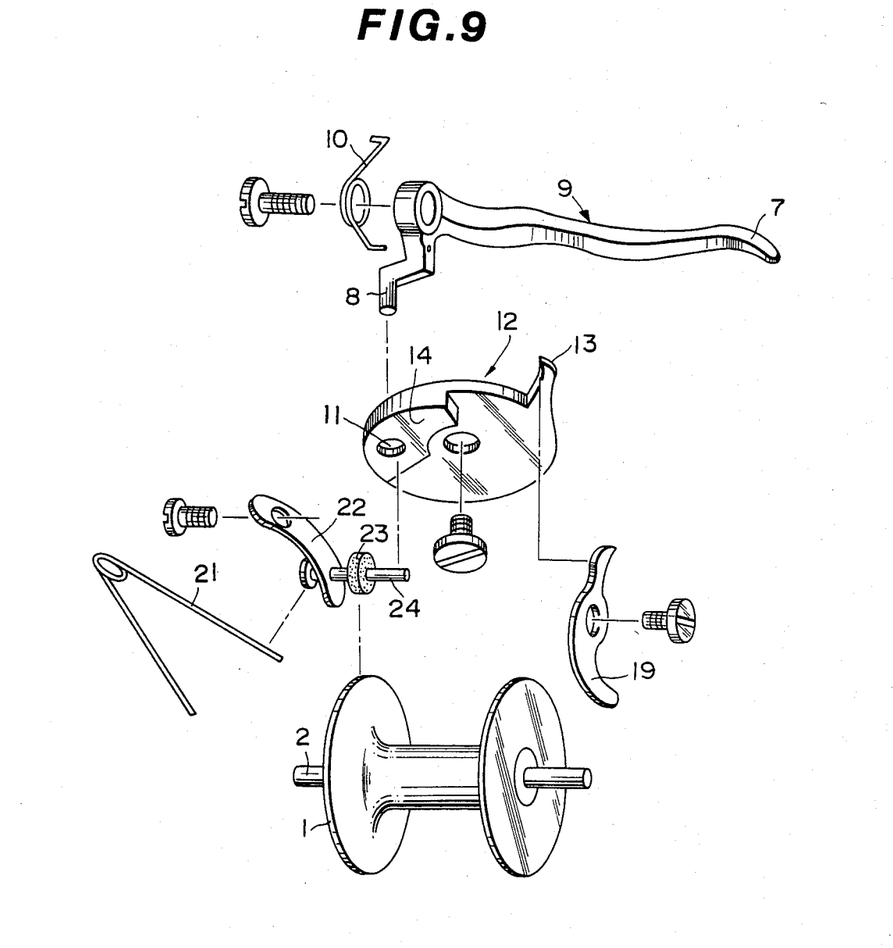
FIG. 9 is an exploded view of principal parts of the present invention.

FIGS. 5 and 6 show an example of the clutch mechanism 18.

The clutch mechanism 18 consists of an engaging plate 25 engaged with the pinion 17 and so urged as to connect the pinion 17 to the spool shaft 2, a bifurcated clutch plate 27 having operating projections 26 slidable on the inner surface of the engaging plate 25, and a dead point spring 28 adapted to urge the clutch plate 27 in the inward or outward direction from the dead point thereof. When the clutch lever 19 comes into engagement with one of the operating projections 26 of the clutch plate 27, so that the operating projection 26 is pressed inward by the operating projection 13, the operating projectings 26 cause the engaging plate 25 to come into sliding contact with the outer surfaces thereof. As a result, the pinion 17 is disengaged from the spool shaft 2.

One of the bifurcations of the clutch plate 27 is provided with a locking projection 29 and an elongated bore 30. The elongated bore 30 is engaged with a pin 32 projecting from an inner frame 31, and a locking member 34 drawn inward at an end portion thereof by a spring 33 is superposed on that portion of the clutch plate 27 which has the elongated bore 30. An elongated bore 35 provided in the locking member 34 is also engaged with the pin 32. When the handle shaft 15 is turned with the pinion 17 in a disengaged state, a stud 37 on a reverse-preventing ratchet wheel 36, which is adapted to be moved pivotally with the handle shaft 15, comes into engagement with the locking member 34 to press the locking projection 29, and push the clutch plate 27 back in the outward direction against the dead point spring 28. Consequently, the operating projections 26 of the clutch plate 27 are disengaged from the engaging plate 25 to allow the pinion 17 to come into engagement with the spool shaft 2. Referring to the drawings, reference numeral 38 denotes a restricting projection of the locking member 34, 39 a reverse-preventing pawl, and 40 the fishing rod.

The embodiment of the present invention is constructed as described above. In order to pay out the fishing line, the operating portion 7 of the operating lever 9 is drawn upward by the forefinger of the hand gripping the fishing rod mounting member 5 and the fishing rod together to pivot the operating lever 9. The operating member 8 of the operating lever 9 turns the pivotable member 12, so that the clutch lever 19 is actuated by the operating projection 13 to render the spool shaft 2 freely rotatable. At the same time, the cam surface 14 is pressed against the spool 1 via the brake roll 23 to brake the spool rotation.

A fishing hook is then cast to a desired position on the water surface, and the operation of drawing the operating lever 9 is released at this time to pay out the fishing line. Backlash of the fishing line can be prevented by drawing the operating lever 9 to regulate the spool braking force of the brake roll 23 to a desired level.

In order to rewind the fishing line, the handle shaft 15 is turned so that the clutch plate 27 is returned outward via the stud 37, locking member 34 and locking projection 29 by the turning force of the handle shaft 15 against the resilient force of the dead point spring 28. Consequently, the spool shaft 2 comes into engagement with the pinion 17, and the fishing line is rewound around the spool 1 by turning the handle shaft 15.

Figure 10:
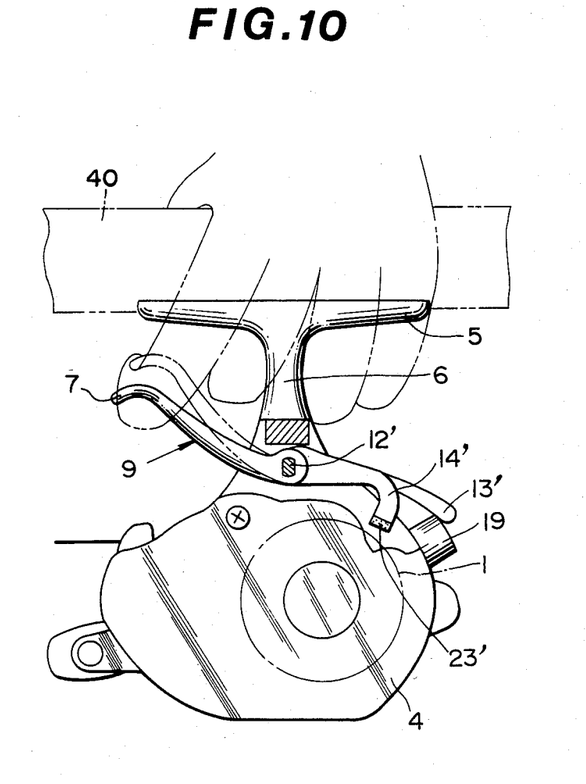
FIG. 10 is a partially cutaway front elevational view in section of another embodiment of the present invention.
Figure 11:
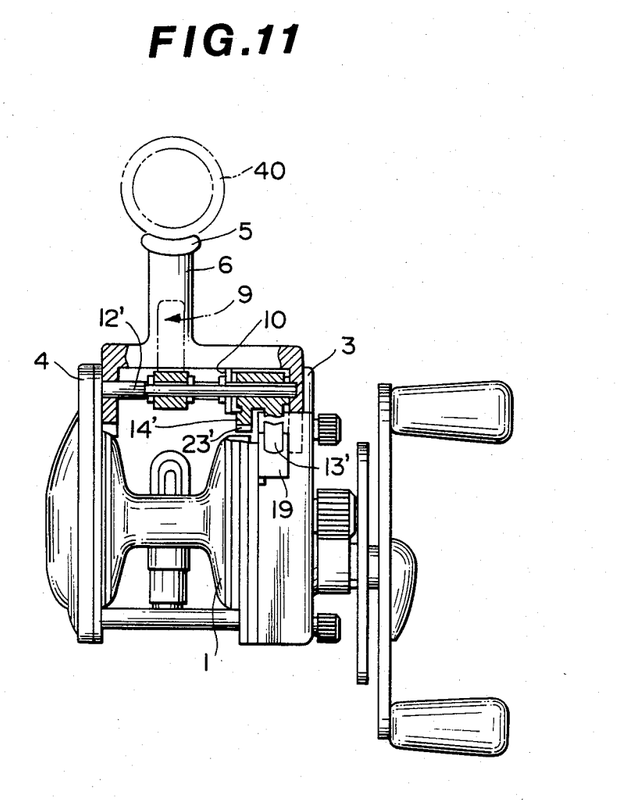
FIG. 11 is a partially cutaway side elevational view in section of the embodiment shown in FIG. 10.

In an embodiment shown in FIGS. 10 and 11, the operating lever 9' is fixedly mounted on a pivot 12' supported on the base portion of the reel mounting leg 6, and the operating portion 7 is urged by the spring 10 away from the fishing line mounting member 5. An operating lever 13' and a spool braking lever 14' having a brake shoe 23' are unitarily and fixedly mounted on that portion of the pivot 12' which is on the side of the side plate 3 of the reel, in such a manner that the operating lever 13' and spool braking lever 14' confront the clutch lever 19 in the clutch mechanism and the flange portion of the spool 1, respectively. When the operating lever 9 is drawn to move it pivotably in the same manner as in the previously-described embodiment by the forefinger of the hand gripping the fishing rod mounting member 5, the spool 1 can be rendered freely rotatable, and the rotation of the spool 1 can be controlled. The degree of spool-braking force can be set to an arbitrary level by regulating the pull on the operating lever.

The clutch mechanism and spool braking mechanism in the present invention are not limited to those employed in the above embodiments. Known mechanisms similar to these mechanisms can, of course, be utilized.

While preferred embodiments of the invention have been described, it is to be understood by those skilled in the art that changes and variations may be made without departing from the spirit or scope of the appended claims.

What is claimed is:

1. A double bearing type fishing reel including a spool shaft with a spool mounted fixedly thereon and supported between right and left side plates of a reel body, a handle shaft, and a clutch mechanism for operatively coupling, and uncoupling, said handle shaft and said spool shaft, said fishing reel comprising:
   a reel mounting leg having a fishing rod mounting member, said leg being fastened between upper portions of said side plates,
   an operating lever connected pivotably to a base portion of said reel mounting leg and having an operating portion opposed to a lower front portion of said fishing rod mounting member,
   a pivotable member engaged with an end of said operating lever above said spool in such a manner that said pivotable member can be turned horizontally,
   operating means, projecting from a circumferential portion of said pivotable member, for actuating said clutch mechanism to render said spool freely rotatably, spool braking means engagable with said operating means for braking the rotation of said spool, and a cam formed on a lower surface of said pivotable member and adapted to actuate said spool braking means.

2. A fishing reel according to claim 1, wherein said spool braking means includes a brake roll having a shaft; means for pivotably supporting said roll in the vicinity of, and in opposition to, the circumference of one flange portion of said spool; means for urging said roll out of contact with said flange portion, said cam formed on the lower surface of said pivotable member being disposed so as to slidingly contact said brake roll shaft, said operating lever being drawn to cause said brake roll to be pressed by said cam against said flange portion of said spool and thereby brake said spool.

* * * * *